US007133325B2

(12) United States Patent
Kotsonis et al.

(10) Patent No.: US 7,133,325 B2
(45) Date of Patent: Nov. 7, 2006

(54) APPARATUS AND METHOD FOR GENERATING ELECTRICAL POWER IN A BOREHOLE

(75) Inventors: Spyro J. Kotsonis, Le Plessis Robinson (FR); Jacques Orban, Le Plessis Garche (FR); Jean-Michel Hache, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 418 days.

(21) Appl. No.: 10/708,512

(22) Filed: Mar. 9, 2004

(65) Prior Publication Data

US 2005/0200210 A1  Sep. 15, 2005

(51) Int. Cl.
*H04H 9/00* (2006.01)

(52) U.S. Cl. .............................. 367/83; 322/51; 290/52; 175/48; 310/15

(58) Field of Classification Search .................. 367/83, 367/84; 322/51; 290/52; 175/48; 310/15
See application file for complete search history.

(56) References Cited

U.S. PATENT DOCUMENTS

| 4,805,407 | A |   | 2/1989  | Buchanan |        |
|-----------|---|---|---------|----------|--------|
| 4,847,815 | A | * | 7/1989  | Malone ........................ | 367/84 |
| 5,248,896 | A | * | 9/1993  | Forrest ........................ | 290/1 R |
| 5,265,682 | A |   | 11/1993 | Russell et al. | |
| 5,517,464 | A |   | 5/1996  | Lerner et al. | |
| 5,586,083 | A | * | 12/1996 | Chin et al. ..................... | 367/84 |
| 5,626,200 | A |   | 5/1997  | Gilbert et al. | |
| 5,636,178 | A | * | 6/1997  | Ritter ........................... | 367/83 |
| 5,793,625 | A |   | 8/1998  | Balogh | |
| 5,946,202 | A |   | 8/1999  | Balogh | |
| 5,969,297 | A |   | 10/1999 | Ambs | |
| 6,219,301 | B1 | * | 4/2001  | Moriarty ....................... | 367/84 |
| 6,233,524 | B1 |   | 5/2001  | Harrell et al. | |
| 6,495,929 | B1 | * | 12/2002 | Bosley et al. ................. | 290/52 |
| 6,607,030 | B1 |   | 8/2003  | Bauer et al. | |
| 7,002,261 | B1 | * | 2/2006  | Cousins ....................... | 290/54 |
| 2004/0140726 | A1 |  | 7/2004 | Spring | |
| 2004/0144570 | A1 |  | 7/2004 | Spring | |
| 2005/0012340 | A1 | * | 1/2005 | Cousins ....................... | 290/52 |

FOREIGN PATENT DOCUMENTS

| GB | 2 397 078       | 7/2004  |
| WO | WO 02/091553   | 11/2002 |
| WO | WO 02/091554   | 11/2002 |
| WO | WO 2004/062081 | 7/2004  |

* cited by examiner

*Primary Examiner*—Albert K. Wong
(74) *Attorney, Agent, or Firm*—Jennie Salazar; Victor H. Segura; Dale V. Gaudier (57) ABSTRACT

An apparatus and related method generate electrical power in a tubular housing, such as a drill collar, disposed in a borehole when drilling fluid flows through the tubular housing. The apparatus includes a stator adapted for being secured within the tubular housing against rotation relative to the tubular housing, a tubular rotor rotatably carried about the stator, and an impeller peripherally affixed to the rotor. The stator has an array of conductive windings therein, and is preferably an alternator stator. The rotor has an array of magnets therein, and is preferably an alternator rotor. Accordingly, drilling fluid flowing through the tubular housing when the apparatus is disposed therein engages the impeller and induces rotation of the rotor about the stator to generate electrical power.

33 Claims, 7 Drawing Sheets

APPARATUS AND METHOD FOR GENERATING ELECTRICAL POWER IN A BOREHOLE

BACKGROUND OF INVENTION

1. Field of the Invention

The present invention relates to downhole tools used in oil and gas drilling operations, and more particularly, to means for generating electrical power for measurement-while-drilling (MWD) tools and processes used in such operations.

2. Background of the Related Art

The drilling of oil and gas wells typically involves the use of several different measurement and telemetry systems to provide data regarding the subsurface formation penetrated by a borehole, and data regarding the state of various drilling mechanics during the drilling process. In MWD tools, data is acquired by sensors located in the drill string near the bit. This data is either stored in downhole memory or transmitted to the surface using a telemetry means, such as mud flow telemetry devices.

Both the downhole sensors and the telemetry means of the MWD tool require electrical power. Since it is not feasible to run an electric power supply cable from the surface through the drill string to the sensors or the telemetry means, electrical power must be obtained downhole. The state of the art MWD devices obtain such power downhole either from a battery pack or a turbine-based alternator. Examples of alternators used in downhole tools are shown in U.S. Pat. No. 5,517,464, assigned to the assignee of the present invention, and U.S. Pat. No. 5,793,625 assigned to Baker Hughes. An example of an alternator-like, electrical torque-generator (for maintaining the angular orientation of a tubular member within a rotary steerable system) is disclosed in U.S. Pat. No. 5,265,682, also assigned to the assignee of the present invention.

Turbine-based alternators employ rotors having impellers that are placed in the high-pressure flow of drilling fluid ("mudflow") inside the drill string so that the impeller blades convert the hydraulic energy of the drilling fluid into rotation of the rotor. The rotors rotate at an angular velocity (speed) that provides enough energy to the MWD tools to power the telemetry means and sensors, and in some cases other tools in the drill string bottom-hole assembly (BHA).

In most conventional designs, the shaft of the turbine (i.e., the rotor) is coupled to an alternator either directly or via a gear train, which may adapt the rotor's rotational speed for optimum operation of the turbine and alternator. The turbine shaft is supported by bearings. Typically, the shaft, bearings, gear train, and alternator are all housed in a pressurized oil chamber in order to function in clean and well-lubricated conditions. Since the turbine shaft is rotating in drilling fluid, a rotary seal is required to isolate the drilling fluid from the oil in the pressurized chamber. As the rotating velocity is high, the face of a typical rotary seal has to be lubricated by something other than the drilling fluid, since the drilling fluid contains erosive particles that will quickly ruin the rotary seal. This lubrication is achieved by ensuring a constant, low-volume oil leak from the chamber towards the rotary seal. This leak also prevents the flowing drilling fluid from invading the oil chamber, which is desirable since the cleanliness of the oil promotes a long operating life for the gears, bearing, and electrical components inside the oil (i.e., drilling fluid particles would erode moving parts and damage the alternator components.)

To achieve this controlled leakage of oil across the rotary seal, the oil in the chamber is slightly pressurized compared the mud pressure by a compensating piston equipped with a spring within the pressurized oil chamber. This piston is required to move over a certain distance over time, which makes the chamber longer and bulkier than it might otherwise have to be. Accordingly, it is well known that the compensating piston and rotary seal tend to make the downhole provision of electrical power expensive.

Furthermore, experience in the art has proven that the majority of the failures and maintenance costs associated with downhole alternators are due to the rotary seals and the length of the oil reservoir pressure-compensation system. A need therefore exists for a downhole power generation system that operates without the need for such components.

A need further exists for a downhole power-generation system that is capable of generating high power in difficult operating conditions, such as the presence of erosive drilling fluid or mud.

Definitions

Certain terms are defined throughout this description as they are first used, while certain other terms used in this description are defined below: "Downstream" means the direction in which drilling fluid is pumped to flow through a drill string, e.g., in the direction of the gravity vector in a vertical well section.

"Particles" means relatively heavy solids, some of which are designed to plug small holes, that are mixed or suspended in a drilling fluid. Particles can exhibit a wide range of sizes, and can include cuttings resulting from the drilling process as well as additives that are used to control the hydrostatic conditions of the borehole.

"Upstream" means the direction opposite to downstream.

SUMMARY OF INVENTION

In one aspect, the present invention provides an apparatus for generating electrical power in a tubular housing disposed in a borehole wherein drilling fluid flows through the tubular housing. The apparatus includes a first stator adapted for being secured within the tubular housing against rotation relative to the tubular housing, a tubular first rotor rotatably carried about the first stator, and an impeller peripherally affixed to the first rotor. The first stator has an array of conductive windings therein, and is preferably an alternator stator. The first rotor has an array of magnets therein, and is preferably an alternator rotor. Accordingly, drilling fluid flowing through the tubular housing when the apparatus is disposed therein engages the impeller and induces rotation of the first rotor about the first stator to generate electrical power.

In a particular embodiment of the inventive apparatus, the first rotor and first stator are sized and shaped so as to define a fluid-conducting annular gap between the first rotor and the first stator. With this design, there is no need for the conventional oil reservoir pressure compensation system, or the associated rotary seal required for oil containment. Thus, the flowing of drilling fluid through the tubular housing when the apparatus is disposed therein also induces conductance of the drilling fluid through the gap to remove heat from the first stator. The gap preferably has a diameter that generally increases in the downstream direction, so as to promote movement of particles in the drilling fluid through the gap. It is further preferred that the gap thickness increases in the downstream direction, so as to reduce the likelihood of buildup and blockage by particles in the drilling fluid.

The first rotor preferably has a non-uniform circumference defined by a first diameter and a second diameter, with the second diameter being greater than the first diameter. The impeller is peripherally affixed to a portion of the first rotor having a circumference defined by the first diameter, and the first rotor has an array of magnets carried in a portion thereof having a circumference defined by the second diameter.

Furthermore, the first rotor and first stator are preferably sized and shaped so as to define at least one entrance and at least one exit for conducting drilling fluid between the first rotor and first stator. A plurality of bearings, including at least one radial bearing and one axial bearing, are provided for supporting movement of the first rotor relative to the first stator. The bearings are lubricated by the drilling fluid. The first rotor may further be equipped with a generally radial channel, or several such channels, therethrough intermediate the one entrance and one exit so as to facilitate the removal of particles in the drilling fluid disposed between the first rotor and the first stator.

Still further, the impeller affixed to the first rotor defines a turbine rotor that complements a turbine stator having a tubular body attached coaxially to an upstream end portion of the first stator. A plurality of blades are peripherally affixed to the tubular body of the turbine stator for disturbing drilling fluid flowing through the tubular housing, whereby particles in the drilling fluid are diverted from the one fluid entrance.

The first rotor and first stator both preferably have downstream end portions, with the downstream end portion of the first stator extending downstream of the downstream end portion of the first rotor. The downstream end portions are sized and shaped so as to define an annulus therebetween adjacent the one exit into which drilling fluid flowing through the one exit will be accelerated to exert a lifting force on the first rotor relative to the first stator. The lifting force has the effect of reducing the frictional forces applied to the axial bearing(s). These frictional forces may be further reduced by a segmented ring within the axial bearing for generating a hydrodynamic film of drilling fluid that inhibits the frictional contact forces.

Still further, an elastically-deformable member may be disposed between the downstream end portion of the first stator and an adjacent downstream axial bearing. Thus, the flowing of drilling fluid through the tubular housing will impose a downward force on the impeller that moves the first rotor axially some distance downstream to compress the elastically-deformable member. Then, when the drilling fluid flow is stopped, the member will expand to lift the first rotor by the same distance. The use of such a member has a number of purposes. For example, the elastically-deformable member may have a spring constant that permits the first rotor to move axially downstream upon the startup of drilling fluid flow a distance sufficient to break a thixotropic gel that may have formed while the drilling fluid was static. Additionally, the member may be used for controlling the speed of the first rotor, so as to avoid complications resulting from wide speed variations.

More particularly, when the inventive apparatus includes a turbine rotor and turbine stator (as mentioned above), the peripheral blades of the tubular body may be located at a separation distance from the turbine rotor for disturbing drilling fluid flowing through the tubular housing so as to enhance the effect of the flowing drilling fluid upon the turbine rotor. In this embodiment, the elastically-deformable member has a spring constant that permits the first rotor and turbine rotor to move axially downstream during drilling fluid flow and increase the separation distance between the turbine rotor and the turbine stator to an extent that the effect of the flowing drilling fluid upon the turbine rotor is reduced. This effect also causes the rotational velocity of the first rotor to be restricted, thereby avoiding certain difficulties associated with wide variations in the speed of the first rotor.

Such axial movement downstream by the first rotor during drilling fluid flow also reduces the coverage by an array of magnets within the first rotor about an array of conductive windings within the first stator, whereby the generation of electrical power is controlled. This is desirable because it narrows the power output range that must be accommodated by certain components, such as MWD electronics in the drill string.

The inventive apparatus may further include a divergent conical member adapted for attachment within the tubular housing. The divergent conical member is sized and shaped so as to permit axial movement of the first rotor and turbine rotor therein, whereby axial downstream movement of the first rotor and turbine rotor within the divergent conical member positions the turbine rotor in a region of reduced-velocity drilling fluid flow. This has the effect of controlling the rotational velocity of the first rotor.

In a particular embodiment of the inventive apparatus, the first stator has an array of conductive windings arranged therein so as to facilitate the monitoring of each winding's voltage output, whereby eccentricity of the first rotor relative to the first stator can be determined. The inventive apparatus may further include an electronic controller for separately adjusting the current flowing through each winding so as to counteract the eccentricity, whereby whirling of the first rotor is inhibited.

In another embodiment, the first stator has an array of conductive windings arranged therein by the internal structure of the stator such that the windings are asymmetrically distributed about the first stator, and the first rotor has an array of magnets arranged therein about an inner rim of the first rotor. Thus, the first rotor applies a resultant magnetic attraction force on the first stator in a fixed radial direction that inhibits whirling by the first rotor.

In another aspect, the present provides a system for generating electrical power in a drill string disposed in a borehole. The system includes a tubular housing connected within the drill string, a stator secured within the tubular housing against rotation relative to the tubular housing, a tubular rotor rotatably carried about the stator, and an impeller peripherally affixed to the rotor. The stator has an array of conductive windings therein, and is preferably an alternator stator. The rotor has an array of magnets therein, and is preferably an alternator rotor. Thus, drilling fluid flowing through the drill string engages the impeller and induces rotation of the rotor about the stator to generate electrical power.

In a particular embodiment of the inventive system, the tubular housing is a drill collar. The system may further include a MWD sensor package and a telemetry device, both disposed in the drill collar and powered by the generated electrical power.

In a further aspect, the present invention provides a method for generating electrical power in a borehole. The method includes the step of rotatably supporting a rotor about a stator, and securing the stator within a drill string against rotation (i.e., such that it does not rotate) relative to the drill string. The stator has an array of conductive windings therein, and is preferably an alternator stator. The rotor has an array of magnets therein, and is preferably an alternator rotor. The drill string is disposed in the borehole, and drilling fluid is flowed through the drill string. The rotor has a peripheral impeller that converts the hydraulic energy of the flowing drilling fluid into rotation of the rotor about the stator to generate electrical power.

In a particular embodiment of the inventive method, the rotor is rotatably supported about the stator by bearings, preferably including at least one axial bearing and one radial bearing that are lubricated by the drilling fluid flowing through the drill string. This embodiment preferably further includes the steps of conducting the flowing drilling fluid through a gap between the stator and the rotor to remove heat from the stator, preventing a buildup of drilling fluid particles within the gap, and reducing the frictional contact at the one axial bearing.

In a particular embodiment, the inventive method further includes the step of diverting particles in the drilling fluid from being conducted between the rotor and stator.

During periods in which drilling fluid is not flowing through the drill string, it will be static and may form a thixotropic gel. Thus, the inventive method may further include the step of breaking a thixotropic gel that has formed between the rotor and stator while the drilling fluid was static.

In a particular embodiment, the inventive method further includes the step of controlling the rotational velocity of the rotor. As mentioned above, such control prevents certain difficulties associated with wide variations in the speed of the rotor.

In a particular embodiment, the inventive method further includes the step of controlling the generation of electrical power. This has the effect of narrowing the range of output (primarily voltage) that must be accommodated by control electronics.

In a particular embodiment, the inventive method further includes the step of predicting the wear of the bearings. Predicting wear, particularly for the radial bearings, can prevent serious damage to the rotor and stator.

In a particular embodiment, the inventive method further includes the step of inhibiting whirling by the rotor.

BRIEF DESCRIPTION OF DRAWINGS

So that the above recited features and advantages of the present invention can be understood in detail, a more particular description of the invention, briefly summarized above, may be had by reference to the embodiments thereof that are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
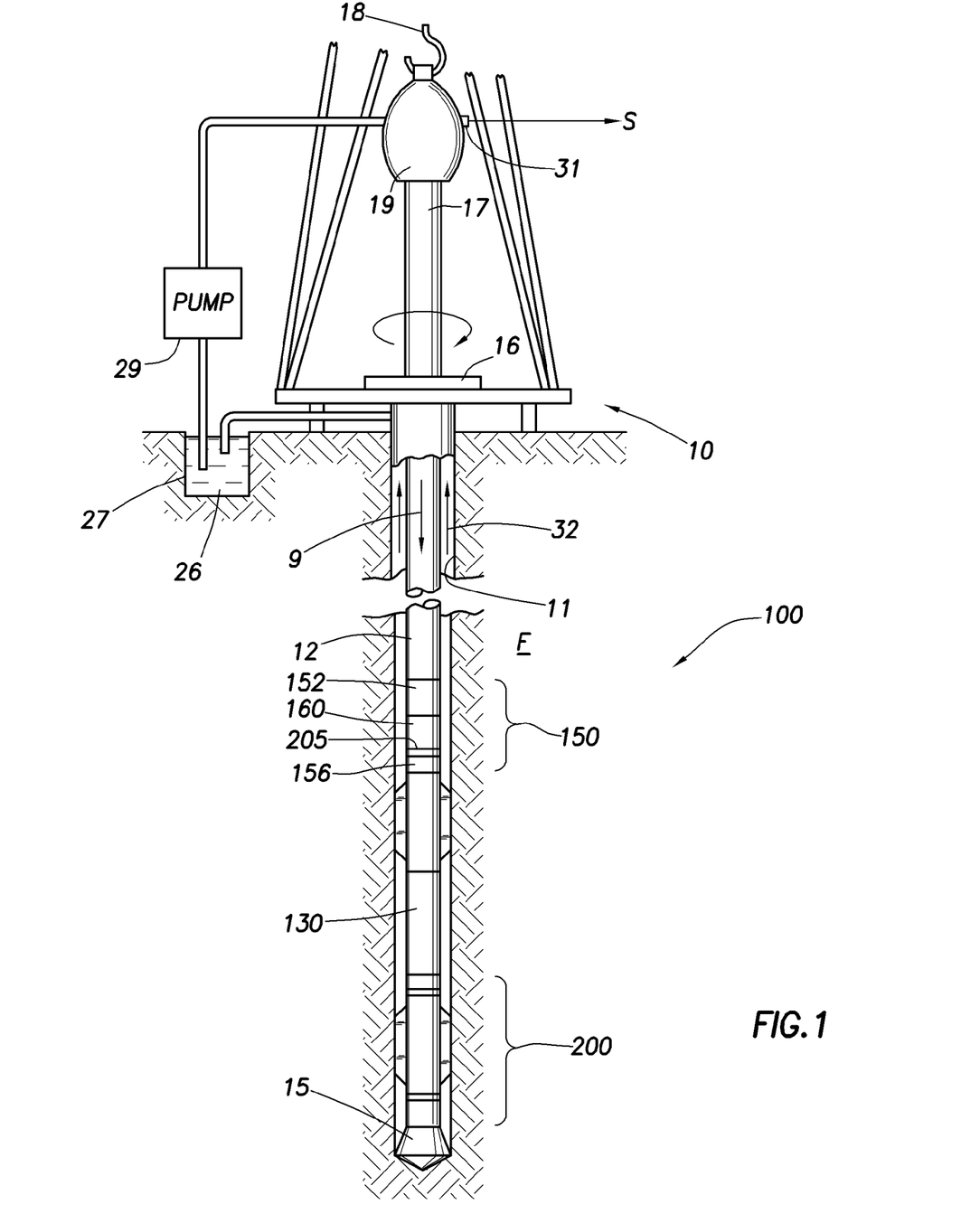
FIG. 1 is an elevational schematic, partially in section, of a drill string having a system for generating electrical power in accordance with the present invention.

FIG. 1 illustrates a convention drilling rig and drill string in which the present invention can be utilized to advantage. A land-based platform and derrick assembly 10 are positioned over a borehole 11 penetrating a subsurface formation F. In the illustrated embodiment, the borehole 11 is formed by rotary drilling in a manner that is well known. Those of ordinary skill in the art given the benefit of this disclosure will appreciate, however, that the present invention also finds application in drilling applications other than conventional rotary drilling (e.g., mudmotor based directional drilling), and is not limited to land-based rigs.

A drill string 12 is suspended within the borehole 11 and includes a drill bit 15 at its lower end. The drill string 12 is rotated by a rotary table 16, energized by means not shown, which engages a kelly 17 at the upper end of the drill string. The drill string 12 is suspended from a hook 18, attached to a traveling block (also not shown), through the kelly 17 and a rotary swivel 19 which permits rotation of the drill string relative to the hook.

Drilling fluid or mud 26 is stored in a pit 27 formed at the well site. A pump 29 delivers the drilling fluid 26 to the interior of the drill string 12 via a port in the swivel 19, inducing the drilling fluid to flow downwardly through the drill string 12 as indicated by the directional arrow 9. The drilling fluid exits the drill string 12 via ports in the drill bit 15, and then circulates upwardly through the region between the outside of the drill string and the wall of the borehole, called the annulus, as indicated by the directional arrows 32. In this manner, the drilling fluid lubricates the drill bit 15 and carries formation cuttings up to the surface as it is returned to the pit 27 for recirculation.

The drill string 12 further includes a bottom hole assembly (BHA), generally referred to as 100, near the drill bit 15 (in other words, within several drill collar lengths from the drill bit). The bottom hole assembly includes capabilities for measuring, processing, and storing information, as well as communicating with the surface. The BHA 100 thus includes, among other things, an apparatus 200 for determining and communicating one or more properties of the formation F surrounding borehole 11, such as formation resistivity (or conductivity), natural radiation, density (gamma ray or neutron), and pore pressure.

The BHA 100 further includes drill collars 130, 150 for performing various other measurement functions. Drill collar 150, in particular, houses a measurement-while-drilling (MWD) tool. The MWD tool 150 includes a communication subassembly 152 that communicates with a similar system (not shown) at the earth's surface, and a sensor package 156 having appropriate sensors for determining real-time drilling parameters such as direction, inclination, and toolface, among other things.

The communication subassembly 152 includes a transmitter that generates a signal, such as an acoustic or electromagnetic signal, which is representative of the measured drilling parameters. The generated signal is received at the surface by transducers, represented by reference numeral 31, that convert the received acoustical signals to electronic signals S for further processing, storage, and use according to conventional methods and systems.

The MWD tool further includes an apparatus 160 for generating electrical power downhole, particularly power for the communication subassembly 152 and the sensor package 156. Accordingly, apparatus 160 is coupled between the communication subassembly 152 and sensor package 156, and is disposed directly in the drilling fluid 26 that flows through the drill string 12 and the MWD drill collar 150.

Figure 2:
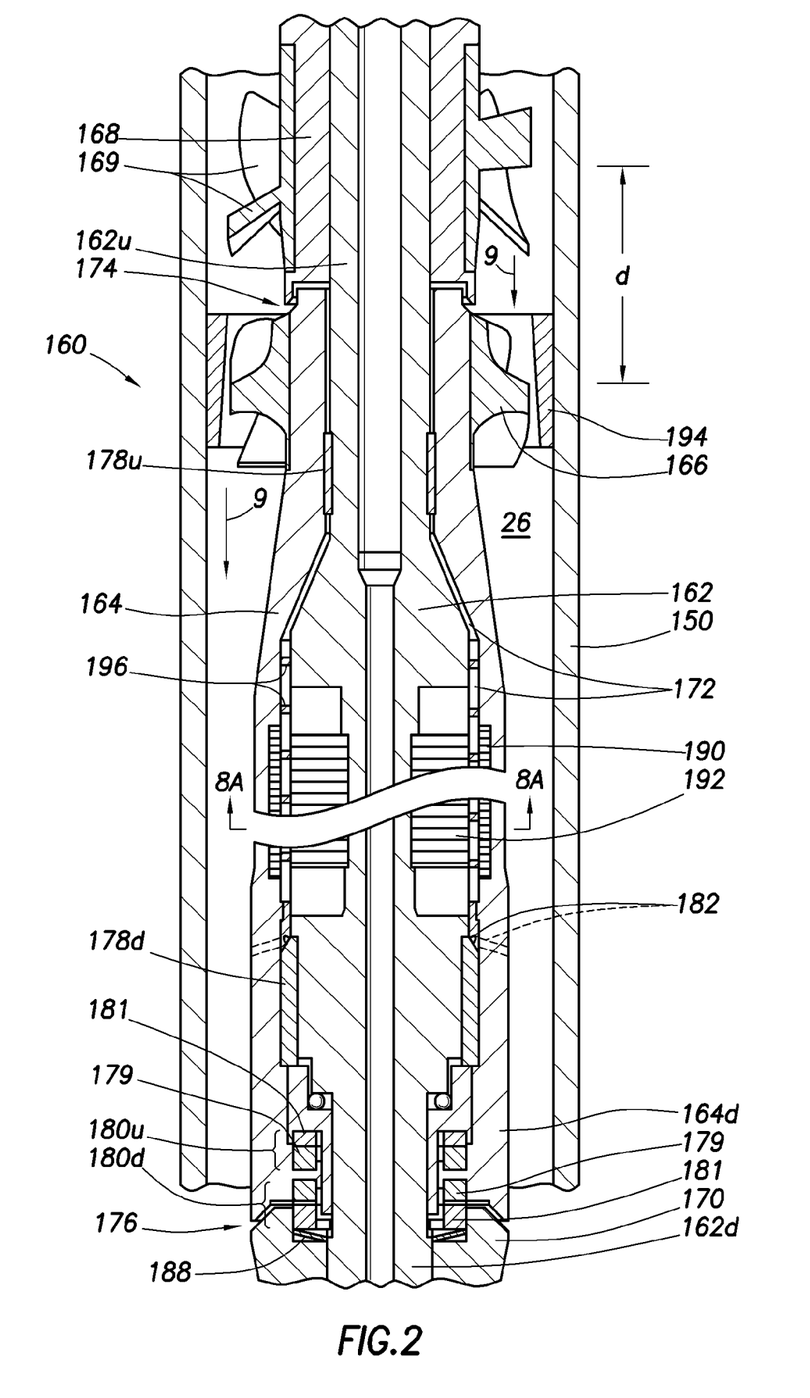
FIG. 2 is a detailed, sectional schematic of an apparatus for generating electrical power downhole in accordance with the present invention.

With reference to FIG. 2, apparatus 160 includes an inner alternator stator 162 adapted for being secured within the drill collar 150 against rotation relative to the drill collar. A tubular alternator rotor 164 is rotatably carried about the alternator stator 162, and an impeller 166 peripherally affixed to the alternator rotor 164. An array of permanent magnets 190 are carried within (or affixed to an inner rim of) the alternator rotor 164 to generate a magnetic flux. An array of multiple-phase, conductive windings 192 are carried within the alternator stator 162. Accordingly, drilling fluid 26 flowing in the direction of arrows 9 through the drill collar 150 engages the impeller 166 and induces rotation of the alternator rotor 164 about the alternator stator 162 to generate electrical power within the alternator stator.

Those skilled in the art will appreciate that the layout of apparatus 160 is the opposite to that of a typical alternator, wherein the rotor is the internal component. One advantage of this unconventional construction is a simplified link between the alternator rotor 164 and the rotating part (i.e., the impeller 166). Another advantage is easier electrical connections since the power-generating windings are stationary at the center. With the electrical windings in the central alternator stator, however, it is important to evacuate the heat generated within the winding structure by magnetic effects in the magnets 190, eddy currents in the scraper sleeve 196 if made of conductive material (scraper sleeve described below), and by ohm loss in the windings 192. This heat is evacuated by mud flowing in the annular alternator gap 172 (also described below), and by conduction across the external alternator rotor 164.

The windings 192 of the alternator stator 162 are isolated from the pressurized drilling fluid 26 in the gap via a relatively thin wall, typically made of a deformable thin metal sheet. This wall ensures fluid isolation, but the pressure of the drilling fluid is supported by the winding laminations and potting (e.g., epoxy) inside the alternator stator wall.

The alternator stator 162 is coaxially attached at an upstream end portion 162u of a tubular turbine stator 168 which in turn is inserted in a sleeve (not shown) conventionally affixed to the drill collar 150. The turbine stator is further coupled to an electronics chassis (not shown) in a conventional manner. The alternator stator 162 is attached at a downstream end portion 162d thereof to a diverter cone 170 that is conventionally shouldered and keyed to the drill collar 150 to prevent downward axial and rotational motion of the alternator stator 162.

In accordance with another advantage of the present invention, there is no rotating seal between the alternator rotor and alternator stator, so that drilling fluid is always present between the components. More particularly, the alternator rotor 164 and alternator stator 162 are sized and shaped so as to define at least one entrance 174 and at least one exit 176, as well as the fluid-conducting annular gap 172, for conducting drilling fluid between the alternator rotor 164 and alternator stator 162.

Special considerations have to be made to accommodate the presence of particles particularly heavy particles within the drilling fluid (mud). These particles can be provided in large amounts as is required to set the mud density for better control of well hydrostatics. Otherwise, particles are added in the drilling fluid as required lost-circulation-material (LCM). These LCM particles cover a wide range of sizes, and their main characteristic is to plug small holes. As mud is flowing within the alternator bearing zones (described below) and the annular gap 172, it is desirable to ensure that particles which enter the gap also exit the gap. For this purpose, it is preferred that all the gap dimensions have no smaller restriction than the size of the fluid entrance 174.

The fluid in the annular gap 172 is rotated due to the rotation of the alternator rotor 164. Due to this rotation, centrifugal acceleration is applied to the fluid and the particles suspended therein. As the drilling fluid particles are heavier than the liquid phase, the particles will be forced towards the outer radial portions of the gap, i.e., the particles will accumulate against the alternator rotor 164. Since a small component of axial flow exists in the drilling fluid within the annular gap 172, new fluid is continuously brought into the gap at the entrance 174. The particles of this new fluid may also be packed against the alternator rotor. As the renewing process is sustained, the packing process could result in the gap becoming fully packed with particles (or thickened mud). The apparatus 166 incorporates several design features to mitigate this packing risk, as will now be described.

Those skilled in the art will appreciate that the impeller 166 also defines a turbine rotor that complements the turbine stator 168, and, more particularly, a plurality of blades 169 peripherally affixed to the tubular body of the turbine stator. The combined effect of the turbine stator and turbine rotor is a disturbance of the drilling fluid 26 flowing through the drill collar 150. In other words, the turbine stator 168 diverts the mudflow from its axial flow path and induces a swirling movement in the drilling fluid before the fluid contacts the turbine rotor 166 for conversion of the kinetic energy of the fluid into rotation. This swirling movement tends to divert particles in the drilling fluid from entering the gap 172 through fluid entrance 174.

It is recognized, however, that some drilling fluid particles particularly smaller particles will make their way into the annular gap 172 via the entrance 174. Accordingly, the annular gap 172 is designed to employ a succession of increasing diameters in the downstream direction (see arrows 9) across most of its axial length, either by "stepping" diameter increases or by gradual profiles. In this fashion, drilling fluid and suspended particles therein are submitted to increased centrifugal acceleration within the gap 172 in the downstream direction. This inhibits particle packing within the gap, and ensures that the heavier materials within the drilling fluid will have tendency to move downstream until they can escape the alternator gap and return into the main mud flow within the drill collar 150 (and drill string 12).

The alternator rotor 164 preferably has a non-uniform circumference defined by a first diameter in its upstream end portion 164u, and a second diameter in its downstream end portion 164d. As shown in FIG. 2, the second (downstream) diameter is greater than the first (upstream) diameter. The impeller 166 is peripherally affixed to the upstream end portion 164u of the alternator rotor, and the array of magnets 190 is carried in the downstream end portion 164d of the alternator rotor. In this fashion, both the cross-sectional area of the impeller 166 and the radius at which the array of magnets 190 is carried are enlarged within the drill collar 150 to enhance the output of the apparatus 160.

As mentioned previously, a plurality of bearings, including upstream and downstream radial bearings 178u, 178d and upstream and downstream axial bearings 180u, 180d, are provided for supporting movement of the alternator rotor 164 relative to the alternator stator 162. The bearings are lubricated by the drilling fluid 26. It should be noted the axial bearings are disposed near a downstream end portion 164d of the alternator rotor 164. The axial bearings are more effective in a region of reduced diameter. Such a reduction is detrimental, however, to the desired effect of downstream axial movement of the drilling fluid particles. To counter the risk of particle buildup and blockage at the axial bearings, the alternator rotor 164 is equipped with a plurality of fluid passage 182 just upstream of the downstream radial bearing. At this location, the diameter of the annular gap 172 is the largest, providing a pumping effect to flush the drilling fluid 26 through the annular gap 172.

Figure 3:
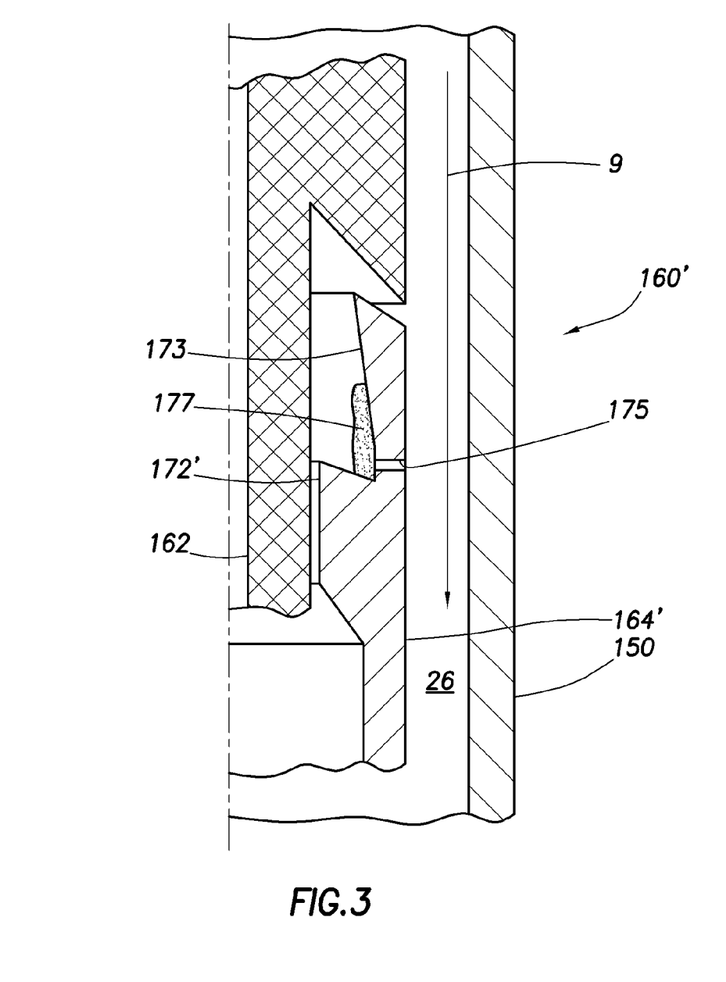
FIG. 3 is a half-schematic representation of a centrifugal cavity and particle escape channel in accordance with an alternative embodiment of the inventive apparatus of FIG. 2.

In an alternative embodiment of the inventive apparatus, referenced as 160" in FIG. 3, a centrifugal cavity 173 and particle escape channel 175 are formed in a portion of alternator rotor 164" defining the annular gap 172". The cavity 173 has the utility of ensuring the particles suspended in the drilling fluid 26 will be collected (see particle buildup 177), under centrifugal pumping action that results, and flushed out of the gap through the escape channel 175.

Figure 4:
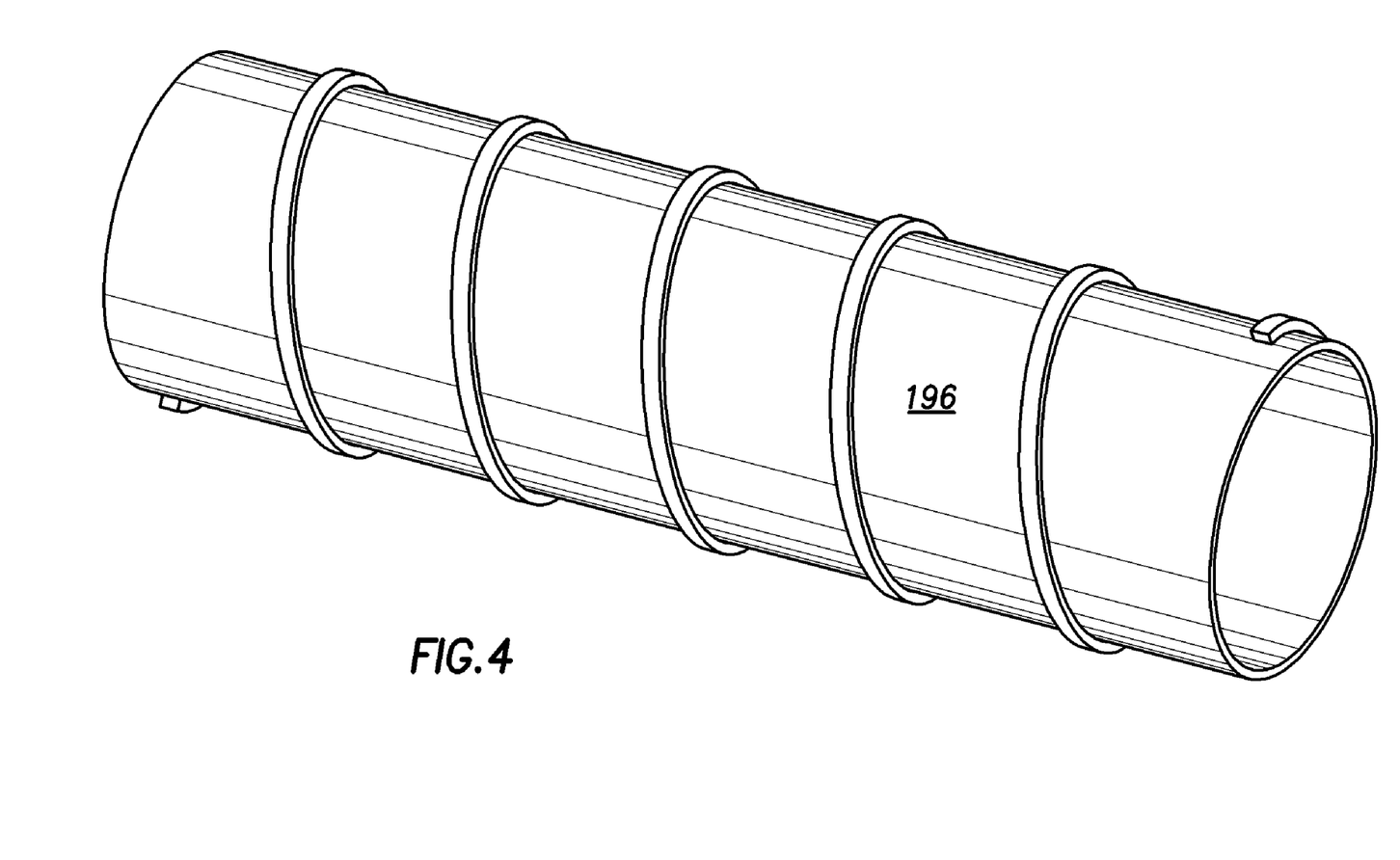
FIG. 4 is a perspective view of a scraper sleeve according to the apparatus of FIG. 2.

FIG. 4 is a perspective view of a scraper sleeve 196 that performs a similar particle-removing function. The scraper sleeve is equipped with one or more helical ribs about its outer surface, and is itself affixed to the outer surface of the alternator stator 162, as shown in FIG. 2. Thus, the helical rib(s) of the scraper sleeve 196 enhance the pumping action generated by the rotation of the alternator rotor 164 about the alternator stator 162 to move drilling fluid particles axially downstream and towards fluid ports 182 and exit 176. This inhibits the likelihood of particle buildup and packing within the annular gap 172.

Since the drilling fluid is abrasive, the bearing sleeves are made of abrasion-resistant materials. The clearance of the radial bearing sleeve is defined as a compromise between the need to ensure good guidance of the rotating parts, ensure good lubrication, and limit whirling effects during rotation, while allowing large particles to move across the clearance.

The axial bearings support the weight of the alternator rotor 164 (especially during shocks), and the axial reaction force from the impeller 166. The axial (or thrust) bearings employ relatively large sets of ring, so as to promote continuity and structural integrity of the MWD tool 150. Accordingly, the radius corresponding to the bearing contact area is relatively large. This large radius generates an appreciable friction force for a given contact force and friction coefficient. It is therefore often helpful to minimize friction at the bearings.

Figure 5:
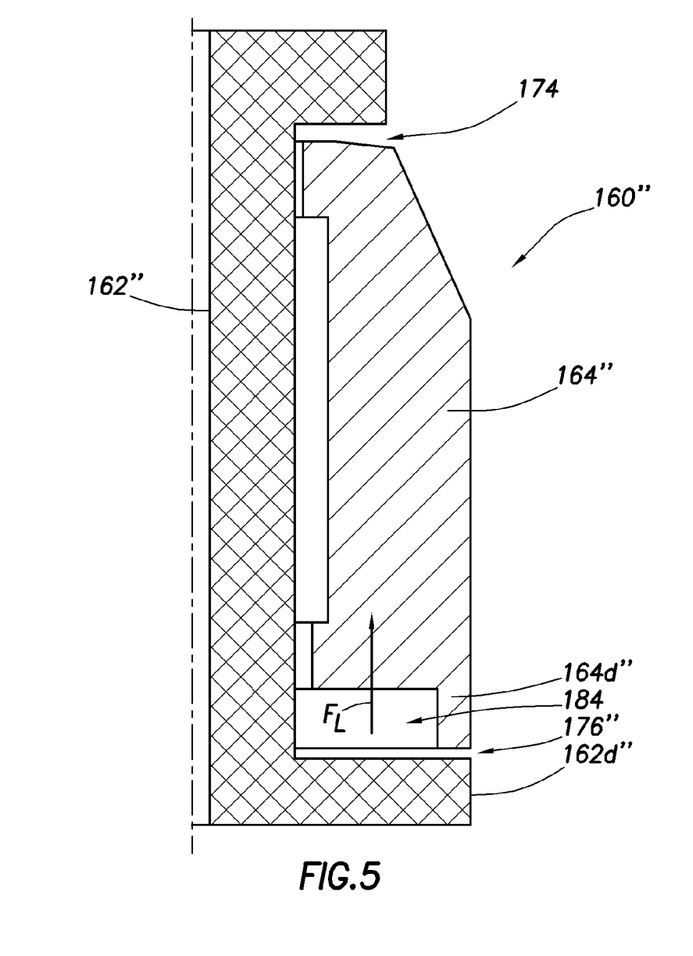
FIG. 5 is a half-schematic representation of an annulus formed between an alternator rotor and alternator stator according to an alternative embodiment of the apparatus of FIG. 2, the annulus permitting acceleration of drilling fluid flowing between the alternator rotor and alternator stator so as to generate a lifting force upon the alternator rotor.

The alternator rotor 164 and alternator stator 162 are equipped with respective downstream end portions 164d and 162d, with the downstream end portion 162d of the alternator stator extending downstream of the downstream end portion 164d of the alternator rotor. With reference now to FIG. 5, the downstream end portions 164d"", 162d"" are sized and shaped in an alternative embodiment of the apparatus 160"" so as to define an annulus 184 therebetween adjacent the fluid exit 176"". With a preferential difference of diameters between the downstream end portions, it is possible to generate an axial hydraulic force that tends to lift the alternator rotor 164"" to reduce the total downward thrust due to the alternator rotor weight and the axial force from the impeller 166. Drilling fluid 26 flowing towards the exit 176"" will be accelerated by the enlarged diameter at the annulus 184 to exert a lifting force $F_L$ on the alternator rotor 164"" relative to the alternator stator 162"". The lifting force has the effect of reducing the frictional forces applied to the axial bearing(s) 180u, 180r (see FIG. 2). With high rotating speeds, the dynamic pressure induced in annulus 184 may become substantial. By the proper control of leakage due to variation of the clearance between the neutral alternator rotor and alternator stator axial positions, the alternator rotor will find the optimum position (slightly displaced downstream) during mudflow and maintain lubrication for both axial bearings.

Figure 6:
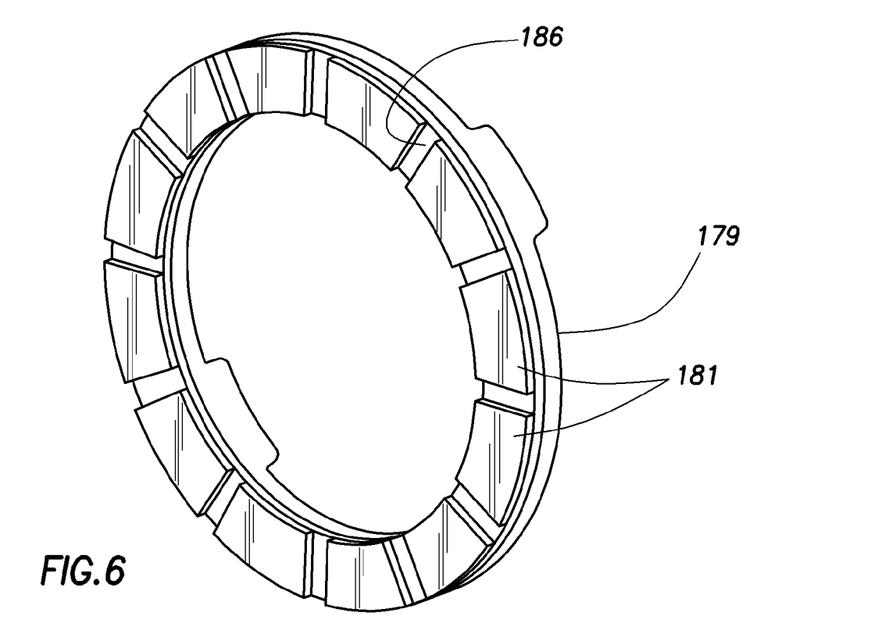
FIG. 6 is a perspective view of a segmented static ring of an axial bearing according to the apparatus of FIG. 2.

The frictional forces at the axial bearings are further reduced by equipping the axial bearings with a segmented static ring 181, as shown in FIGS. 2 and 6. The segmented static ring cooperates with a rotating ring 179 employed by each of the axial bearings so that a small angle is formed between the static ring and the rotating ring, whereby a fluid hydrodynamic wedge effect occurs when the alternator rotor is rotated by mudflow. This hydrodynamic effect generates a lubricating film 186 that reduces, and eventually suppresses, direct solid contact between alternator rotor 164 and alternator stator 162. Thanks to this film 186, dry friction is fairly reduced (or even suppressed) and wear of the axial thrust bearings is significantly reduced. This has the advantage of reducing the torque required of the impeller 166 for rotation of the alternator rotor 164.

With reference again to FIG. 2, an elastically-deformable member 188, such as a coil spring segment or elastomeric disk, is disposed between the downstream end portion 162d of the alternator stator (adjacent the diverter cone 170) and the downstream axial bearing 180r. Thus, the flowing of drilling fluid 26 through the drill collar 150 will impose a downward force on the impeller 166 that moves the alternator rotor 164 axially some distance downstream to compress the elastically-deformable member 188. Then, when the drilling fluid flow is stopped, the member 188 will expand to lift the alternator rotor 164 by the same distance to assume a neutral position. The use of such a member 188 has a number of purposes.

For example, during periods in which drilling fluid is not flowing through the drill string, it will be static and may form a thixotropic gel. It is possible that, upon start up of drilling fluid flow, the impeller 166 will be unable to generate sufficient torque to break such a gel. Accordingly, the elastically-deformable member 188 may be provided with a spring constant that permits the alternator rotor 164 to move axially downstream a relatively small distance upon the startup of drilling fluid flow. This distance is sufficient to break the thixotropic gel that may have formed while the drilling fluid was static. The combination of the shear force due to the impeller-applied torque and the axial movement will break the mud gel and allow easier rotation upon startup.

Those skilled in the art will appreciate that the rotational velocity of the alternator rotor 164 depends on drilling fluid (mud) flow rate, the mud density (as the kinetic energy depends on these two elements), as well as the electrical current in the winding which generates reaction torque, and the mud viscosity. Due to the nature of these influencing variables, it is predicted that the alternator will operate on a wide range of rotating speeds, which creates difficulties. For example, the voltage output from the alternator stator 162 will vary widely over the speed range, making the design of the MWD control electronics difficult. Secondly, various resonance modes may be present in a wide range of speeds that subject the apparatus 160 to shock and/or damage.

It is therefore often helpful to control the range of rotating speeds for the alternator rotor 164. One solution is to utilize various braking mechanisms that may be activated at higher speeds. While this technique is quite efficient to limit the speed range, the impeller 166 must generate the required alternator power and breaking power simultaneously. Under high speeds, the total power demanded may cause significant erosion in the impeller blades.

Another advantage of the present invention is therefore related to limiting the speed range without placing undue demands on the impeller 166. Accordingly, the elastically-deformable member 188 may be designed with a spring constant that permits the alternator rotor 164 to be displaced axially over a distance greater than the displacement needed for gel-breaking application (described previously). Then, at higher drilling fluid flow rates, the axial force of the impeller 166 increases until the turbine moves axially downstream under compression of the member 188. This results in a separation distance d between the turbine stator blades 169 and the turbine rotor (impeller) 166 that exceeds the optimum distance, whereby the drilling fluid leaving the turbine stator loses the optimum angle to attack the turbine rotor 166. This reduces the momentum that the turbine rotor can convert into torque of the alternator rotor 164, whereby the speed of the alternator rotor is limited even when operating in high drilling fluid-flow conditions.

The inventive apparatus 160 further includes in a particular embodiment a divergent conical member 194 is adapted for attachment within the drill collar 150, as shown in FIG. 2. The divergent conical member 194 is sized and shaped so as to permit axial movement of the alternator rotor 164 and turbine rotor (impeller) 166 therein, whereby axial downstream movement of the alternator rotor and turbine rotor under drilling fluid flow in the direction 9 positions the turbine rotor 166 in a region of reduced-velocity drilling fluid flow within the divergent conical member 194. This has the effect of further controlling the rotational velocity of the alternator rotor 164.

Figure 7:
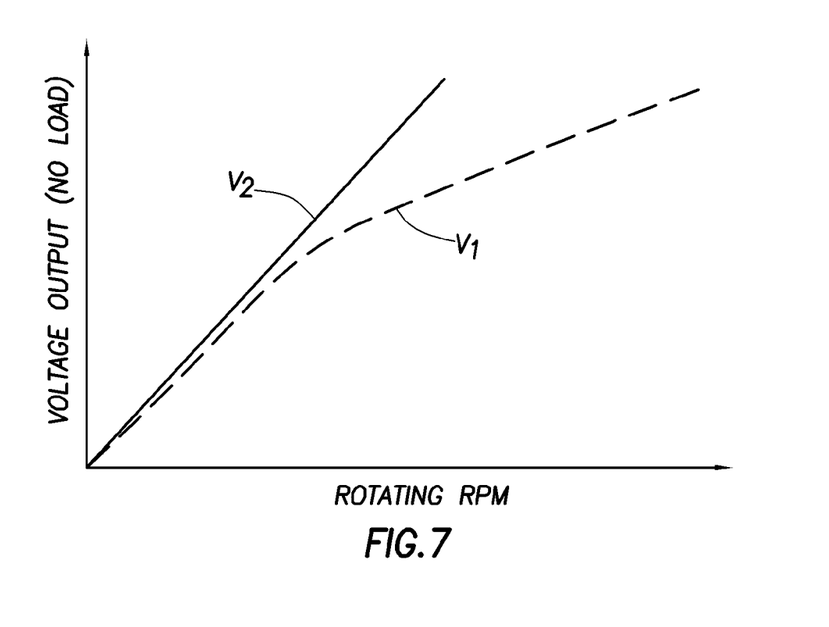
FIG. 7 is a plot illustrating the effect that axial displacement of an alternator rotor has on voltage output, in accordance with the present invention.

Such axial movement downstream by the alternator rotor 164 during drilling fluid flow also reduces the coverage by the array of magnets 190 within the alternator rotor 164 about the array of conductive windings 192 within the alternator stator 192, whereby the generation of electrical power is controlled. This effect reduces the voltage output (see $V_1$ in FIG. 7) that would otherwise be achieved (see $V_2$) for a given rotational speed. This control is desirable because it narrows the power output range that must be accommodated by certain components, such as electronics in the MWD tool.

Figure 8A:
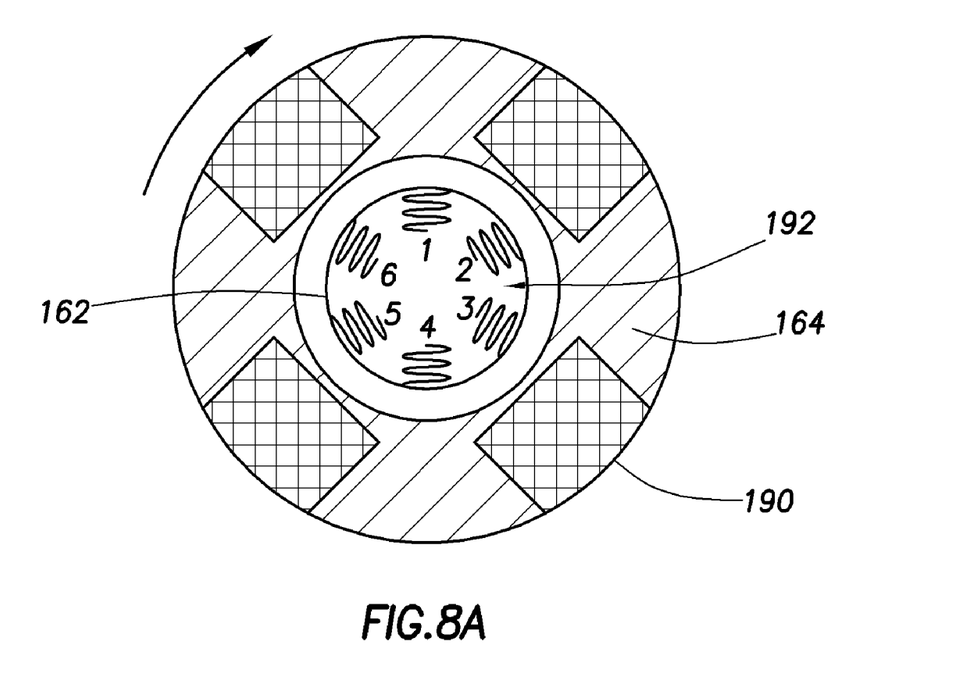
FIG. 8A is a cross-sectional schematic, taken along section line 8A—8A of FIG. 2, showing the multiple windings of an alternator stator within an alternator rotor having four permanent magnets.
Figure 8B:
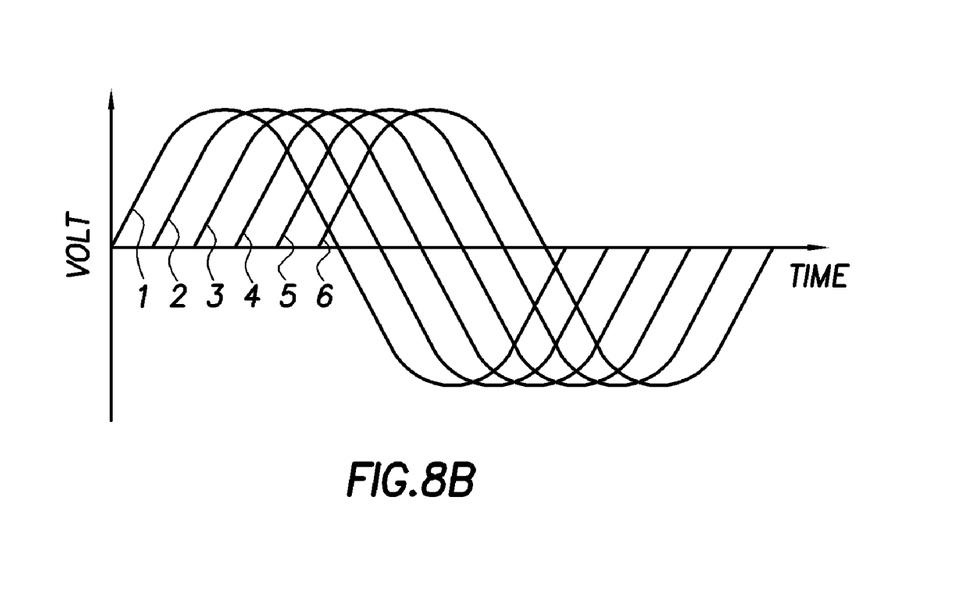
FIG. 8B is a plot of the voltage output of the alternator stator windings according to the apparatus of FIG. 8A.
Figure 9A:
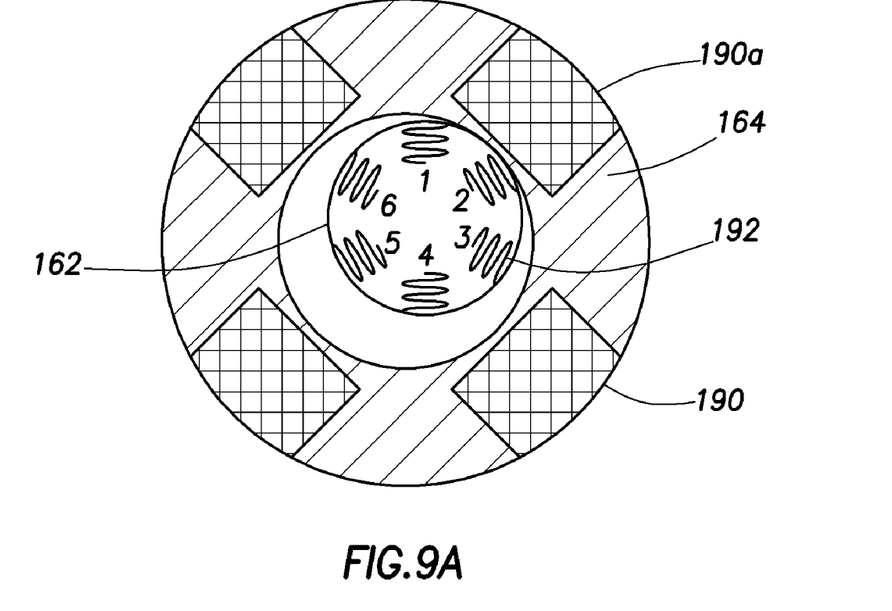
FIG. 9A is a similar cross-section schematic to that of FIG. 8A, but showing a radial displacement of the alternator stator within the alternator stator.
Figure 9B:
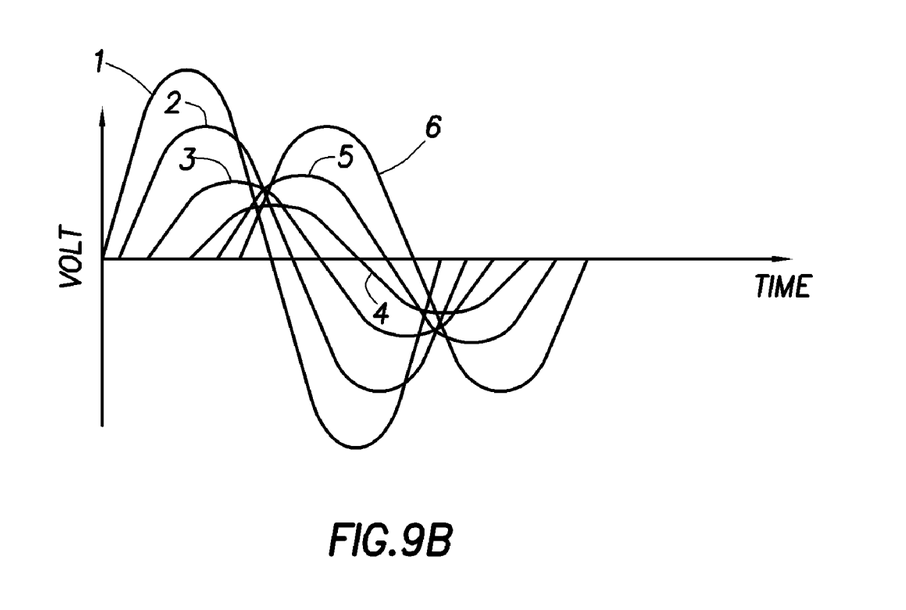
FIG. 9B is a plot of the voltage output of the alternator stator windings according to the displacement of FIG. 9A, in contrast to the plot of FIG. 8B.

With mud-lubricated bearings, wear is expected to occur under most operating conditions. It is therefore desirable to monitor bearing wear to avoid reaching a wear level where the alternator will experience significant damage or failure. Such damage could, e.g., be generated by either high shocks (especially radial shocks) due to the increased clearance, or by abrasion of the alternator stator by the alternator rotor (or vise-versa). Accordingly, in the particular embodiment of the inventive apparatus 166 shown in FIG. 2, the array of conductive windings 192 within the alternator stator 162 are arranged so as to facilitate the monitoring of each winding's voltage output separately. In this fashion, the eccentricity of the alternator rotor relative to the alternator stator or more particularly, the variation in radial position of each winding can be determined. When the individual windings 192 are separated from the permanent magnets 190 by a common distance, as shown in FIG. 8A, they will develop common voltage outputs, as shown in FIG. 8B. However, when the individual windings 192 are separated from the magnets 190 by differing distances, as shown in FIG. 9A, they will develop inversely-differing voltages, as shown in FIG. 9B. Thus, e.g., winding 1 is shown to have little or no separation from magnet 190a (FIG. 9A), but winding 1 generates the largest voltage output amplitude (FIG. 9B).

By monitoring the voltage output amplitude of each alternator stator winding 192, it is possible to analyze the frequency content of the voltage for each winding. The primary fluctuation will correspond to the AC frequency of the alternator stator for the given alternator rotor rotational speed (depending on pole configuration). The other fluctuation will be related to the variation of alternator rotor's eccentricity. This analysis allows the determination of the eccentricity of the alternator rotor and the dependence of this eccentricity over time. It is therefore possible to predict when the rotor wear will reach a pre-defined eccentricity (wear) limit, and plan to service the radial bearings accordingly.

Because the apparatus 160 is mud-lubricated, it operates with relatively large clearances in the radial bearings. These large clearances tend to facilitate whirling of the alternator rotor 164 within the alternator stator 162. One solution for retarding such whirling is to generate a perpendicular force on the alternator rotor, applied at a fixed direction relative to the alternator stator. This may be achieved by making the internal structure of the alternator stator axially asymmetric, whereby the windings therein are asymmetrically arranged so the resultant force of the radial magnetic attraction of the rotor is always directed to a fixed direction. This asymmetry could be achieved by leaving an empty space between two consecutive windings, such as between windings 1 and 2 depicted in FIG. 8A.

An alternative embodiment of the present invention (not shown) actively retards whirling of the alternator rotor. Using again the concept of monitoring the voltage output of each winding 192 (described above), it is possible to determine the instantaneous position of the alternator rotor center (see, e.g., FIGS. 9A–9B). As previously explained, the winding corresponding to the smallest gap will have the largest voltage output. By forcing this winding to have a larger current than the other ones, this winding current will generate a counter magnetic flux which opposes the magnetic flux generated in the alternator rotor. This reduces the local attraction of the alternator rotor (see, e.g., winding 1 in FIG. 9A), which tends to move the alternator in an opposite direction (e.g., towards winding 4). The "forced current" effect is produced with proper MWD control electronics.

It will be understood from the foregoing description that various modifications and changes may be made in the preferred and alternative embodiments of the present invention without departing from its true spirit.

This description is intended for purposes of illustration only and should not be construed in a limiting sense. The scope of this invention should be determined only by the language of the claims that follow. The term "comprising" within the claims is intended to mean "including at least" such that the recited listing of elements in a claim are an open group. "A," "an" and other singular terms are intended to include the plural forms thereof unless specifically excluded.

What is claimed is:

1. An apparatus for generating electrical power in a tubular housing disposed in a borehole wherein drilling fluid flows through the tubular housing, the apparatus comprising:
   first stator adapted for being secured within the tubular housing against rotation relative to the tubular housing, the first stator having an array of conductive windings therein;
   a tubular first rotor rotatably carried circumferentially about the first stator, the first rotor having an array of magnets therein; and
   an impeller peripherally affixed to the first rotor;
   whereby drilling fluid flowing through the tubular housing when the apparatus is disposed therein engages the impeller and induces rotation of the first rotor about the first stator to generate electrical power.

2. The apparatus of claim 1, wherein the first rotor and first stator are sized and shaped so as to define at least one entrance and at least one exit for conducting drilling fluid between the first rotor and first stator, and further comprising a plurality of bearings for supporting movement of the first rotor relative to the first stator, the bearings being lubricated by the drilling fluid.

3. The apparatus of claim 2, wherein the first rotor and first stator are sized and shaped so as to define a fluid-conducting annular gap between the first rotor and the first stator, whereby the flowing of drilling fluid through the tubular housing when the apparatus is disposed therein also induces conductance of the drilling fluid through the gap to remove heat from the first stator.

4. The apparatus of claim 3, wherein the gap has a diameter that generally increases in the downstream direction, so as to promote movement of particles in the drilling fluid through the gap.

5. The apparatus of claim 3, wherein the gap has a thickness that generally increases in the downstream direction, so as to promote movement of particles in the drilling fluid through the gap.

6. The apparatus of claim 2, wherein the first rotor is equipped with a generally radial channel therethrough intermediate the one entrance and one exit so as to facilitate the removal of particles in the drilling fluid disposed between the first rotor and the first stator.

7. The apparatus of claim 2, wherein the impeller defines a turbine rotor, and further comprising a turbine stator having
   a tubular body attached coaxially to an upstream end portion of the first stator, and
   a plurality of blades peripherally affixed to the tubular body for disturbing drilling fluid flowing through the tubular housing, whereby particles in the drilling fluid are diverted from the one entrance.

8. The apparatus of claim 2, wherein the bearings include radial bearings and axial bearings.

9. The apparatus of claim 2, wherein the first rotor and first stator both have downstream end portions, the downstream end portion of the first stator extending downstream of the downstream end portion of the first rotor, the downstream end portions being sized and shaped so as to define an annulus therebetween adjacent the one exit into which drilling fluid flowing through the one exit will be accelerated to exert a lifting force on the first rotor relative to the first stator.

10. The apparatus of claim 8, wherein the bearings include at least one axial bearing that employs a segmented ring for generating a hydrodynamic film of drilling fluid that reduces the frictional contact at the one axial bearing.

11. The apparatus of claim 10, wherein the bearings include at least one downstream axial bearing disposed between the downstream end portions, and further comprising an elastically-deformable member disposed between the downstream end portion of the first stator and the downstream axial bearing, whereby the flowing of drilling fluid through the tubular housing imposes a downward force on the impeller that moves the first rotor axially some distance downstream, compressing the member, and the member expands to lift the first rotor by the same distance when the drilling fluid flow is stopped.

12. The apparatus of claim 11, wherein the elastically-deformable member has a spring constant that permits the first rotor to move axially downstream upon the startup of drilling fluid flow a distance sufficient to break a thixotropic gel that may have formed while the drilling fluid was static.

13. The apparatus of claim 11, wherein the impeller defines a turbine rotor, and further comprising a turbine stator having
   a tubular body attached coaxially to an upstream end portion of the first stator, and
   a plurality of blades peripherally affixed to the tubular body at a separation distance from the turbine rotor for disturbing drilling fluid flowing through the tubular housing so as to enhance the effect of the flowing drilling fluid upon the turbine rotor, and further wherein the elastically-deformable member has a spring constant that permits the first rotor and turbine rotor to move axially downstream during drilling fluid flow and increase the separation distance between the turbine rotor and the turbine stator to an extent that the effect of the flowing drilling fluid upon the turbine rotor is reduced, whereby the rotational velocity of the first rotor is restricted.

14. The apparatus of claim 13, further comprising a divergent conical member adapted for attachment within the tubular housing and being sized and shaped so as to permit axial movement of the first rotor and turbine rotor therein, whereby axial downstream movement of the first rotor and turbine rotor within the divergent conical member positions the turbine rotor in a region of reduced-velocity drilling fluid flow which reduces the rotational velocity of the first rotor.

15. The apparatus of claim 11, wherein the axial movement downstream by the first turbine during drilling fluid flow reduces the coverage by the array of magnets within the first rotor about the array of conductive windings within the first stator, whereby the generation of electrical power is reduced.

16. The apparatus of claim 1, wherein the array of conductive windings within the first stator are arranged therein so as to facilitate the monitoring of each winding's voltage output, whereby eccentricity of the first rotor relative to the first stator can be determined.

17. The apparatus of claim 1, wherein the array of conductive windings within the first stator are arranged by the internal structure of the stator such that the windings are asymmetrically distributed about the first stator, and the array of magnets within the first rotor are arranged therein about an inner rim of the first rotor, whereby the first rotor applies a resultant magnetic attraction force on the first stator in a fixed radial direction that inhibits whirling by the first rotor.

18. The apparatus of claim 16, further comprising an electronic controller for separately adjusting the current flowing through each winding so as to counteract the eccentricity, whereby whirling of the first rotor is inhibited.

19. The apparatus of claim 1, wherein
the first rotor has a non-uniform circumference defined by a first diameter and a second diameter, the second diameter being greater than the first diameter,
the impeller is peripherally affixed to a portion of the first rotor having a circumference defined by the first diameter, and
the array of magnets within the first rotor are carried in a portion of the first rotor having a circumference defined by the second diameter.

20. A system for generating electrical power in a drill string disposed in a borehole, comprising:
a tubular housing connected within the drill string;
a stator secured within the tubular housing against rotation relative to the tubular housing, the stator having an array of conductive windings therein;
a tubular rotor rotatably carried about the stator, the rotor having an array of magnets therein; and
an impeller peripherally affixed to the rotor;
whereby drilling fluid flowing through the drill string engages the impeller and induces rotation of the rotor about the stator to generate electrical power.

21. The system of claim 20, wherein the tubular housing is a drill collar.

22. The system of claim 21, further comprising a MWD sensor package and a telemetry device, both disposed in the drill collar and powered by the generated electrical power.

23. A method for generating electrical power in a borehole, the method comprising the steps of:
rotatably supporting a rotor about a stator, the rotor having a peripheral impeller;
securing the stator within a drill string against rotation relative to the drill string, the drill string being disposed in the borehole; and
flowing drilling fluid through the drill string, whereby the impeller converts the hydraulic energy of the drilling fluid into rotation of the rotor about the stator to generate electrical power.

24. The method of claim 23, wherein the rotor is rotatably supported about the stator by bearings that are lubricated by the drilling fluid flowing through the drill string.

25. The method of claim 23, further comprising the step of conducting the flowing drilling fluid through a gap between the stator and the rotor to remove heat from the stator.

26. The method of claim 25, further comprising the step of preventing a buildup of drilling fluid particles within the gap.

27. The method of claim 23, further comprising the step of diverting particles in the drilling fluid from being conducted between the rotor and stator.

28. The method of claim 24, wherein the bearings include at least one axial bearing, and further comprising the step of reducing the frictional contact at the one axial bearing.

29. The method of claim 23, further comprising the step of breaking a thixotropic gel that formed between the rotor and stator while the drilling fluid was static.

30. The method of claim 23, further comprising the step of controlling the rotational velocity of the rotor.

31. The method of claim 23, further comprising the step of controlling the generation of electrical power.

32. The method of claim 24, further comprising the step of predicting the wear of the bearings.

33. The method of claim 23, further comprising the step of inhibiting whirling by the rotor.

* * * * *